United States Patent Office  2,775,223
Patented Dec. 25, 1956

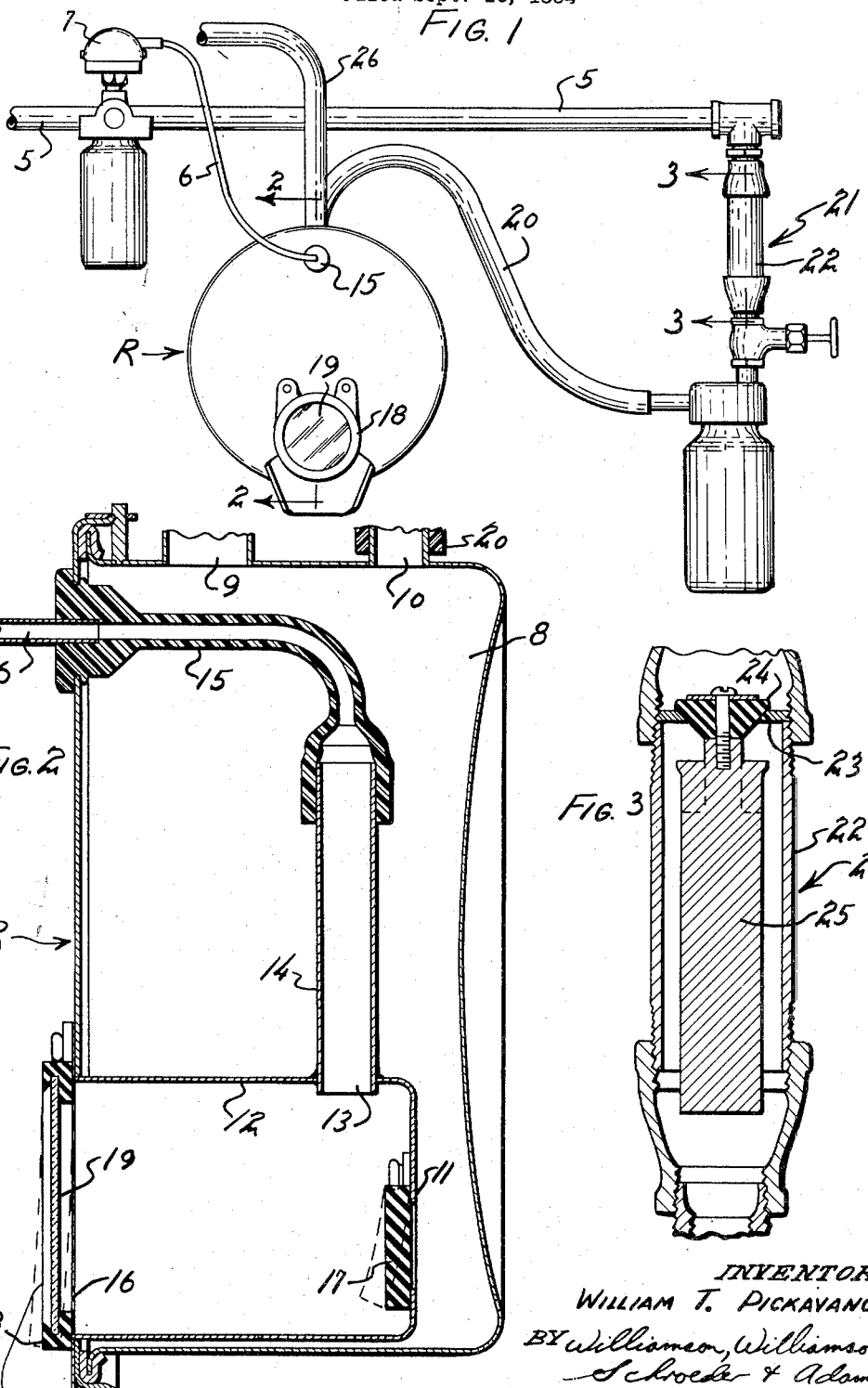

2,775,223
MILK LINE RELEASING APPARATUS

William T. Pickavance, Albert Lea, Minn., assignor to National Cooperatives, Inc., Chicago, Ill., a corporation of the District of Columbia Application September 16, 1954, Serial No. 456,357

7 Claims. (Cl. 119—14.07)

This invention relates to milking apparatus. More particularly, it relates to means for removing the milk from a central line fed by a plurality of milking machines and for discharging the same into a cooling vat.

In recent years manufacturers of milking machine apparatus have taken positive steps to reduce the amount of apparatus required for the milking operation. As a direct result it is now common to utilize a central sanitary milk line running lengthwise of the line of stanchions in which the cows stand while being milked, in lieu of a plurality of individual milk pails. The milk is transported through such lines through the use of a partial vacuum applied to the line at its terminal discharge portion and thus a problem is created by the need for a speedy, sanitary and efficient discharge of the milk supply into a cooling vat without an attendant loss of vacuum in the line.

It has been known that the milk may be removed from the central line referred to by utilizing a releasor which employs a pair of connected chambers having inlets and outlets with valves thereon to effect a transfer of the milk by gravity flow in two steps to the vat. This, however, has not proved sufficiently rapid and efficient for not only does it take too long a period for the milk to pass from one container to the other, but also too much milk remains in the first chamber and fails to be discharged into the second chamber during each operation. Only a limited supply of milk can be handled in this manner because of the time element and the load capacity of such a device. My invention is directed toward overcoming these disadvantages.

It is a general object of my invention to provide novel and improved apparatus for withdrawing milk from a central milk line while under a vacuum.

A more specific object is to provide novel and improved apparatus for withdrawing milk from a central milk line operating under reduced pressure which will function more rapidly and efficiently.

Another object is to provide novel and improved apparatus for withdrawing milk from such a line which will accomplish its purpose in a more rapid and positive manner.

Another object is to provide novel and improved apparatus for withdrawing milk from a central milk line operating under reduced pressure which will handle a substantially larger amount of milk in a given period of time.

These and other objects and advantages of my invention will more fully appear from the following description made in connection with the accompanying drawings wherein like reference characters refer to similar parts throughout the several views and in which:

Fig. 1 is a front elevational view of one embodiment of my invention;

Fig. 2 is a vertical sectional view on an enlarged scale taken along line 2—2 of Fig. 1; and Fig. 3 is a vertical sectional view on an enlarged scale taken along line 3—3 of Fig. 1.

One embodiment of my invention may include as shown in Figs. 1-3 a vacuum line 5 connected to mechanism (not shown) for removing air from the line and constituting a source of vacuum or negative air pressure. This vacuum line 5 is connected by a branch line 6 to a milk-releasing mechanism indicated generally as R. A pulsator 7 of the conventional type used in the milking machine industry is inserted in the branch line 6 between the main line 5 and the milk releasing mechanism R. This pulsator functions to connect the interior of the releasing mechanism R with the main vacuum line 5 at regular spaced intervals and to introduce air into the interior of the air releasing mechanism between each of said connections. This is the conventional means of operation of a pulsator as is commonly known in the art. Most such pulsators are capable of regulation so that the period during which the vacuum is applied may be adjusted.

The interior and construction of the milk releasing mechanism R is best shown in Fig. 2. It is comprised of a milk-receiving chamber 8 having a milk inlet 9 and a vacuum inlet 10. It also has an outlet 11 which causes its interior to communicate with the interior of a milk delivery chamber 12. As shown, the milk delivery chamber is constructed within the walls of the milk-receiving chamber. The milk-delivering chamber 12 has a vacuum inlet 13 which is connected by a tube 14 and a flexible connection 15 to the branch line 6 to complete the connection between the main vacuum line 5 and the interior of the milk delivery chamber 12. The milk delivery chamber 12 also has a milk discharge outlet 16.

Secured to the walls of the milk delivery chamber 12 is a pressure-sensitive valve 17 which is of the flexible flapper-type. This valve element is free-swinging and swings inwardly into the milk delivery chamber 12 when it is desired to open the outlet 11 of the milk-receiving chamber 8. When it hangs vertically as shown in Fig. 2 it closes off the outlet 11. A second and similar pressure-sensitive valve 18 closes off the discharge outlet 16 of the milk delivery chamber 12. This flapper-type valve 18 is provided with a glass window 19 and is capable of swinging outwardly to open the discharge outlet 16. As shown in Fig. 2, the valve 18 closes the milk discharge outlet of the milk delivery chamber 12 when it hangs in vertical position.

The main vacuum line 5 is also connected by a branch line 20 to the vacuum inlet 10 of the milk-receiving chamber 8. A vacuum regulating mechanism or governor indicated generally as 21 is inserted in the branch line 20 between the main vacuum line 5 and the milk releasing mechanism R. As best shown in Fig. 3, it is comprised of an elongated sleeve 22 having a valve seat 23 formed therein. A weighted valve member 24 cooperates with the valve seat 23 to close off the interior of the sleeve 22 when the weight thereof plus the vacuum above the valve 24 equals the suction or vacuum below the valve. The weights 25, as shown, are equal to approximately three pounds of vacuum so that the valve element will remain closed so long as the vacuum thereabove is no more than three pounds greater than the vacuum therebelow. As can be readily seen the valve is free to move upwardly and downwardly with free sliding movement within the sleeve 22.

The milk inlet 9 is connected to the main milk line 26 as best shown in Fig. 1 so as to supply the milk to the milk releasing mechanism R.

In operation of partial vacuum is created the milk-receiving chamber 8 as a result of the connection between the vacuum inlet 10 and the branch line 20. I have found that by using fourteen pounds suction in the main line 5, a suction of eleven pounds will be created within the milk-receiving chamber 8. This is ample to maintain the flow of milk through the main milk line 26 and into the milk-receiving chamber. The suction within the chamber 8 draws the valve 17 to tightly closed position and the chamber proceeds to partially fill with the milk. The pulsator 7 is set so as to provide sufficient time to allow the chamber 8 to be substantially filled to almost fill the chamber 12 when the contents of the chamber 8 are permitted to pass thereinto. At the close of this filling period the pulsator 7 connects the interior of the milk delivery chamber 12 with the main source of vacuum 5 so that the air therewithin will be immediately withdrawn until there is a negative air pressure of fourteen pounds therewithin. Since the suction of fourteen pounds exceeds the suction within the milk-receiving chamber 8 by three pounds, the flapper valve 17 will be immediately swung to open position and the milk will rush into the chamber 12 while emptying the chamber 8. In view of the substantial difference between the suction between the two chambers, substantially all of the milk will be withdrawn from the chamber 8 and the chamber 12 will be substantially filled. The pulsator 7 is set so as to release atmospheric air through the tubes 14 and 15 and into the milk delivery chamber when the milk has been withdrawn into the chamber 12. Thereupon the flapper valve 17 will immediately be forced by the milk to closed position and the flapper valve 18 will swing to open position permitting the milk to run outwardly through the opening 16 and to be discharged into the cooling vat. The weight of the milk is sufficient to swing the valve 18 to open position. While the milk is being emptied from the milk-delivering chamber 12, the milk-receiving chamber 8 will be in the process of being replenished by the movement of the milk through the main line 26 and the milk inlet 9. When the chamber 12 has emptied, the pulsator will again connect the interior of the chamber 12 with the main source of vacuum 5 and the entire operation will be repeated. In this manner the chambers 8 and 12 are alternatively filled and emptied in a repeated operation.

It will be readily seen that the chamber 8 will be emptied much more quickly as a result of the differential in pressure between the two chambers 8 and 12 than if the weight of the milk alone were permitted to cause the passage of the milk from one chamber to the other. In other words, I have provided a positive pull on the milk to much more quickly empty the chamber 8 and fill the chamber 12. This enables the apparatus to handle a considerably larger amount of milk in a given period of time while permitting the use of a single source of vacuum. It will be readily seen that the load capacity of this apparatus is substantially increased through the use of differential in pressure in the two chambers and that this differential in pressure is made possible directly through the use of the vacuum regulating mechanism 21 used in combination with the milk-releasing mechanism R.

It should also be noted that through the use of the differential in pressure, the chamber 12 will be filled to a substantially higher level and the chamber 8 will be emptied more completely than would be true if the mere weight of the milk alone were depended upon the effect the transfer of the milk from the milk-receiving chamber 8 to the milk delivery chamber 12.

It will, of course, be understood that various changes may be made in the form, details, arrangement and proportions of the parts without departing from the scope of my invention which consists of the matter shown and described herein and set forth in the appended claims.

What I claim is:

1. Milk handling apparatus comprising a milk line, a milk-receiving chamber having a milk inlet connected to said milk line and receiving milk therefrom and having a vacuum inlet and a milk outlet, a source of vacuum connected with said vacuum inlet, a valve interposed between said source of vacuum and said vacuum inlet and movable between open and closed positions and maintaining the vacuum within said chamber at a lower value than at said source of vacuum, a weight connected to said valve and urging it toward closed position, a pressure-sensitive valve element extending across said outlet and opening and closing the same, a milk-delivering chamber connected to said outlet in milk-receiving relation and having a milk discharge outlet, and having a vacuum inlet connected to said source of vacuum, a pressure sensitive valve element extending across said milk discharge outlet and opening and closing the same, and mechanism connected with the vacuum inlet of said milk-delivering chamber for causing said last mentioned vacuum to be applied to the interior of said milk delivery chamber at spaced regular intervals.

2. Milk handling apparatus comprising a milk line, a milk-receiving chamber connected to said milk line in milk-receiving relationship and having a vacuum inlet and a milk outlet, a pressure-sensitive valve element extending across said outlet and opening and closing the same, a source of vacuum connected with said vacuum inlet, a milk-delivering chamber connected to said outlet in milk-receiving relation and having a milk discharge outlet and having a vacuum inlet connected to said source of vacuum, gravity actuated control mechanism interposed between said source of vacuum and the vacuum inlet of said milk-receiving chamber and maintaining the vacuum within said milk-receiving chamber at a lower value than at said source of vacuum, a pressure-sensitive valve extending across said milk discharge outlet and opening and closing the same, and mechanism interposed between said source of vacuum and the vacuum inlet of said milk-delivering chamber for causing said source of vacuum to be applied to the interior of said milk-delivering chamber at spaced regular intervals.

3. Milk handling apparatus comprising a milk line, a milk-receiving chamber connected to said line in milk-receiving relationship and having a vacuum inlet and a milk outlet, a pressure-sensitive valve element extending across said outlet and opening and closing the same, said element opening said outlet when the pressure within said chamber is greater than the pressure on its exterior adjacent said valve element and closing the same when the reverse is true, a source of vacuum connected with said vacuum inlet, weighted valve mechanism interposed between said source of vacuum and said vacuum inlet for maintaining the vacuum within said chamber at a lower value than at said source of vacuum, a milk-delivering chamber connected to said outlet in milk-receiving relation and having a milk discharge outlet and having a vacuum inlet connected to said source of vacuum, a pressure-sensitive valve extending across said milk discharge outlet and opening and closing the same, said last mentioned valve opening said milk discharge outlet when the pressure is greater within said milk-delivering chamber than the pressure on its exterior adjacent its valve and closing the same when the opposite conditions exist, and mechanism interposed between said source of vacuum and the vacuum inlet of said milk-delivering chamber for causing said source of vacuum to be applied to the interior of said milk delivering chamber only at spaced regular intervals.

4. Milk handling apparatus comprising a milk line, a milk-receiving chamber connected to said milk line in milk-receiving relationship and having a vacuum inlet and a milk outlet, a source of vacuum connected with said vacuum inlet, automatic pressure control mechanism interposed between said source of vacuum and said vacuum inlet for maintaining the vacuum within said chamber at a lower value than at said source of vacuum, a milk-delivering chamber connected to said outlet in milk-receiving relation and having a vacuum inlet connected to said source of vacuum, a pressure-sensitive valve controlling said outlet and opening the same when the pressure is less within said milk-delivering chamber than in the interior of said milk-receiving chamber and closing the same when the opposite conditions exist, said milk-delivering chamber having a milk discharge outlet, a pressure-sensitive valve controlling said milk discharge outlet and opening the same when the pressure is greater within said milk-delivering chamber than the exterior and closing the same when the opposite is true, and vacuum control mechanism interposed between said source of vacuum and the vacuum inlet of said milk-delivering chamber for causing the vacuum of said source of vacuum to be applied to the interior of said milk-delivering chamber at spaced intervals only.

5. Milk handling apparatus comprising a milk line, a milk-receiving chamber connected to said milk line in milk-receiving relationship and having a vacuum inlet and a milk outlet, a source of vacuum connected with said vacuum inlet, a valve seat interposed within the connection between said source of vacuum and said vacuum inlet, a gravity urged weighted valve element interposed within the connection between said source of vacuum and said vacuum inlet and cooperating with said valve seat to create a differential in vacuum at opposite sides of said valve seat to thereby maintain the vacuum within said chamber at a lower value than at said source of vacuum, a milk-delivering chamber connected to said milk-receiving chamber in milk-receiving relation and having a milk discharge outlet and having a vacuum inlet connected to said source of vacuum, a pressure-sensitive valve controlling the connection between said milk-receiving chamber and said milk-delivering chamber and opening the same when the pressure is greater within said milk-receiving chamber than in said milk-delivering chamber and closing the same when the opposite conditions exist, a pressure-sensitive valve controlling said milk discharge outlet of said milk-delivering chamber and opening the same when the pressure is greater on the inside of said milk-delivering chamber than at the exterior and closing the same when the opposite conditions exist, and control mechanism interposed between said source of vacuum and the vacuum inlet of said milk-delivering chamber for causing the vacuum of said source of vacuum to be applied to the interior of said milk-delivering chamber only at spaced regular intervals.

6. Milk handling apparatus comprising a milk line, a milk-receiving chamber connected to said milk line in milk-receiving relationship and having a vacuum inlet and an outlet, a pressure-sensitive valve element controlling said outlet and opening the same when the pressure is greater within said chamber adjacent said outlet than at the opposite side of said outlet, a source of vacuum connected with said vacuum inlet, automatic vacuum control mechanism interposed between said source of vacuum and said vacuum inlet for maintaining the vacuum within said chamber at a lower value than at said source of vacuum, a milk-delivering chamber connected to said outlet in milk-receiving relation and having a milk discharge outlet and having a vacuum inlet connected to said source of vacuum, a pressure-sensitive valve controlling said milk discharge outlet and opening the same when the pressure is greater within said milk-delivering chamber than at the exterior and closing the same when the opposite conditions exist, and a pulsator interposed within the connection between said source of vacuum and said milk-delivering chamber for causing the vacuum at said source of vacuum to be applied to the interior of said milk-delivering chamber at spaced regular intervals only.

7. Milk handling apparatus comprising a milk line, a milk-receiving chamber connected to said milk line in milk-receiving relationship and having a vacuum inlet and a milk outlet, a source of vacuum connected to said vacuum inlet, vacuum regulating mechanism interposed within the connection between said source of vacuum and said vacuum inlet for maintaining the vacuum within said chamber at a lower value than at said source of vacuum, a milk-delivering chamber connected to said outlet in milk-receiving relation and having a vacuum inlet connected to said source of vacuum, a flapper-type valve extending across said outlet and being swingable outwardly from said milk-receiving chamber to open said outlet when the pressure is greater within said milk-receiving chamber than within said milk-delivering chamber and closing said outlet when the opposite conditions are true, said milk delivering chamber having a milk discharge outlet, a flapper-type valve extending across said milk discharge outlet and swinging outwardly from said milk-delivering chamber to open said milk discharge outlet when the pressure is greater within said milk-delivering chamber than at the exterior and to close the same when the opposite conditions exist, and a pulsator interposed between said source of vacuum and the vacuum inlet of said milk-delivering chamber for causing the interior of said milk-delivering chamber to be alternatively connected to said source of vacuum and the free atmosphere.

References Cited in the file of this patent
UNITED STATES PATENTS 1,159,185    Davis et al. _____ Nov. 2, 1915

FOREIGN PATENTS 173,532    Canada _____ Nov. 28, 1916